United States Patent [19]
Higgins

[11] Patent Number: 6,122,224
[45] Date of Patent: Sep. 19, 2000

[54] VARIABLE INTEGRATION DETECTION APPARATUS AND METHOD FOR MULTIPATH ENVIRONMENTS

[75] Inventor: Robert C. Higgins, Tiverton, R.I.

[73] Assignee: The United States of America as represented by the Secretary of the Navy, Washington, D.C.

[21] Appl. No.: 09/173,611

[22] Filed: Oct. 8, 1998

[51] Int. Cl.[7] .................................................. H04B 1/06
[52] U.S. Cl. .................................................. 367/135
[58] Field of Search .............................. 367/135, 97, 127

[56] References Cited

U.S. PATENT DOCUMENTS

| | | | |
|---|---|---|---|
| 5,420,827 | 5/1995 | Feintuch | 367/127 |
| 5,646,958 | 7/1997 | Tsujimoto | 375/233 |

*Primary Examiner*—Daniel T. Pihulic
*Attorney, Agent, or Firm*—Michael J. McGowan; Robert W. Gauthier; Prithvi C. Lall

[57] ABSTRACT

A receiver and method are disclosed that improves signal detection in a multipath environment wherein the desired reflected acoustic pulse is degraded by multipath reflections and embedded in noise. The invention provides a receiver that repetitively processes the received signal. The receiver includes separate signal processors, such as parallel configured quadrature signal processors, wherein each processor operates over different, and preferably contiguous, time intervals. After each repetition, the processing time interval for each processor is changed. The outputs of the processors are combined, such as by summing, and applied to a detector, such as a threshold detector, for each processing repetition to determine if the transmitted pulse is detected. The receiver continues processing the received signal until a predetermined number of time intervals have been processed without detection of a pulse or until the reflected pulse is detected. The processing can be accomplished in real time because the repetition rate of processing is much faster than the rate at which pulses are transmitted and received.

19 Claims, 1 Drawing Sheet

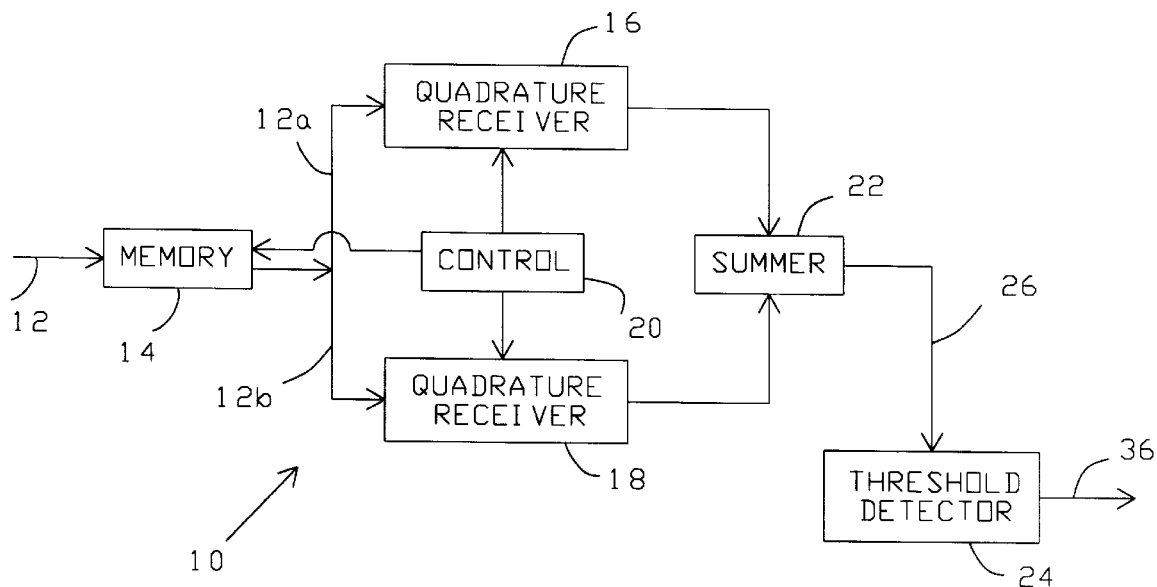
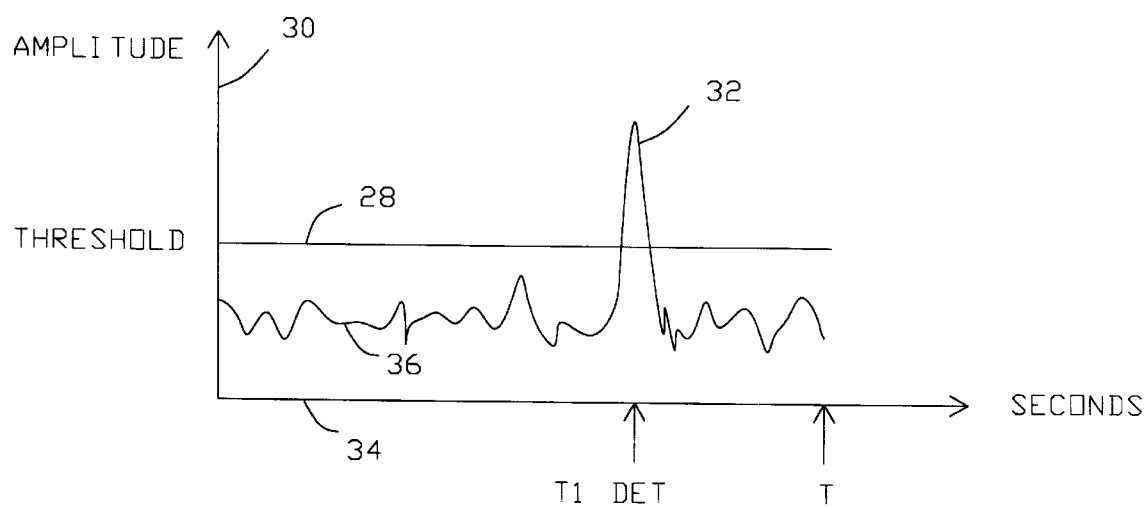

VARIABLE INTEGRATION DETECTION APPARATUS AND METHOD FOR MULTIPATH ENVIRONMENTS

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

The present invention relates generally to reception of underwater signals in a multipath environment and, more specifically, to a variable integration apparatus and method for improving detection performance.

(2) Description of the Prior Art

Underwater acoustic sonar signals and other similar types of signals that propagate through fluids are more difficult to detect when degraded by a multipath environment. Multipath is a term that describes a type of environment wherein a transmitted signal follows more than one propagation path before returning to the receiver. As a result of the typically different and unequal signal propagation path lengths that the transmitted signal follows in the multipath environment, several delayed versions of the transmitted signal arrive at the receiver with each delayed signal having a different amplitude and phase. When the received multipath signals overlap, the sum of all the signals creates a composite received signal that has random amplitude and phase characteristics. When this occurs, an underwater object is difficult to detect using a conventional signal processor, such as a quadrature receiver.

Quadrature receivers and operation thereof are described in the book *Detection of Signals in Noise* by A. D. Whalen, published by Academic Press, N.Y. 1971, which publication is hereby incorporated herein by reference. While other types of receivers may be used in accord with the present invention, a quadrature receiver is typically used for reception/processing of acoustic signals and therefore the present invention is discussed in terms thereof. The quadrature receiver performs best when the received signal is coherent, i.e., constant but with an unknown amplitude and phase. When the transmitted signal has been affected by multipath interference, it becomes incoherent and the performance of the quadrature receiver is degraded.

U.S. Pat. No. 5,321,668, issued Jun. 14, 1994, to R. E. Rouquette, discloses a method for determining the ranges between pairs of transceivers deployed underwater. The transceivers transmit acoustic pulses to and receive acoustic pulses from other of such transceivers according to a coordinated schedule of individual transmission times and reception windows stored in each transceiver. A central controller in communication with all the transceivers compiles the individual schedules, collects the transmit and reception time data, and computes the ranges therefrom. The method does not include repetitively parallel processing of a stored received signal while altering respective processing periods during each processing iteration.

U.S. Pat. No. 5,208,786, issued May 4, 1993, to Weinstein et al., discloses a system to separate unknown signals that have been combined together through unknown linear filters and for which observations at multiple sensors are made. In a two channel circuit with two inputs and two sensors, the reconstructed source signals are assumed to be decorrelated such that the cross-correlation between the signals is near zero, e.g., propeller noise and a sonar signal. However, return signals detected in a multipath environment are generated from the same source and may not be assumed to have a cross-correlation near zero.

U.S. Pat. No. 4,910,718, issued May 20, 1990, to M. Horn, discloses a system for locating a source of acoustic emissions wherein two multi-element transducers are employed. The elements are subjected to an impinging acoustic wave at different moments in time depending upon the angle of the wave. The outputs from the elements of each transducer are compared with a look-up table to determine the angle. Then, another look-up table is used to determine the X-Y intersection of impinging wave angles from both transducers which locates the source. The system is not designed to detect a signal embedded in multipath noise.

Consequently, there remains a need for a receiver that offers more accurate detection of signals reflected in a multipath environment. Those skilled in the art will appreciate the present invention that addresses the above and other problems.

SUMMARY OF THE INVENTION

Accordingly, it is an object of the present invention to provide an improved system and method for detecting a reflected signal in a multipath environment.

It is another object of the present invention to use conventional reception equipment, such as quadrature receivers, in a new configuration and operation for improved reception.

It is yet another object of the present invention to provide an apparatus and technique for improved reception of acoustic signals in a multipath environment such as might be applicable for measuring underwater signals, oilfield acoustic signals, medical acoustic signals, and the like.

These and other objects, features, and advantages of the present invention will become apparent from the drawings, the descriptions given herein, and the appended claims.

In accordance with the present invention, a system is provided for detecting a reflected acoustic signal that is embedded in noise in a multipath environment, i.e., the received signal includes multiple reflections of an acoustic signal, such as a pulse, embedded in noise. The system comprises at least two receivers for processing the received signal. A combining component, such as a summer, is provided for combining respective outputs of each of the two receivers to produce a combined output. A detector component produces a detection signal when the combined output produces a characteristic signal that exceeds a predetermined threshold level. At least one control component is provided for controlling the receivers such that each of the receivers operates on the received signal over a different respective time period. A memory stores the received signal so that it can be repetitively fed to the receivers. The control component varies the time lengths during which the receivers operate on the received signal for each processing repetition. Preferably but not necessarily, the receivers are quadratrure receivers. The different time periods during which the received signal is processed are preferably contiguous and have a total time of time T, which is equivalent to the transmitted pulse duration.

The method for detecting the reflected acoustic signal in a multipath environment comprises dividing the received signal into at least two processing intervals which have respective time spans. Processing occurs repetitively with the respective time span of the two processing intervals changing for each of the repetitions. The received signal is independently processed over each of the two intervals to provide at least two outputs. The two outputs are monitored for a characteristic signal and the processing repetition ceases upon production of the characteristic signal. The outputs are combined, such as by adding, to produce a combined output. The combined output is compared to a selected threshold level to indicate the presence of an underwater object. Alternatively, the processing repetition preferably ceases after a preselected number of repetitions if no characteristic signal is produced during any of the processing repetitions. To accomplish this, the received signal is saved in a memory so that it can be repetitively processed with parallel configured processors, such as quadrature receivers. The time intervals preferably include the time intervals from an initial point to a time T1 and then from the time T1 to a time T. In the preferred embodiment, the processing time is less than the time interval between pulses.

A feature of the present invention is quadrature receivers in parallel that are connected to the same input and whose outputs are combined to produce an output signal. Yet another feature of the present invention is a control to change the length of the processing time intervals over which each independently processor operates with each processing repetition. An advantage of the present invention is a significant improvement in detection performance within a multipath environment.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein:

FIG. 1 is a block diagram of a variable integration detector in accord with the present invention; and FIG. 2 is a graph showing summed output of parallel quadrature receivers during an integration over period T wherein the integration intervals are optimal for detecting a received pulse.

BRIEF DESCRIPTION OF THE PREFERRED EMBODIMENTS

Referring now to the drawings and more specifically to FIG. 1, there is shown a presently preferred embodiment of a receiver or variable integrator detector 10 in accord with the present invention. As discussed in more detail subsequently, the present invention and method embodied by receiver 10 automatically divides received pulse 12 into two separate intervals denoted 12a and 12b, processes 12a and 12b separately, and then combines the results. This procedure is repeated many times and for each iteration the separation time between 12a and 12b is varied until the process is ended as discussed below so that processing is preferably, but not necessarily, completed prior to receipt of the next received pulse or signal 12.

Received signal 12 comprises a multipath signal embedded in noise due to the underwater environment. A transmitted signal to be received may typically be a pulse, such as a sinusoidal pulse. However, other types of transmitted signals may also be used. As discussed hereinbefore, the transmitted signal may follow multiple propagation paths resulting in the received multipath signal. For the present discussion, the receiver and transmitter/source are presumed to be co-located or located relatively close together with respect to the typical signal path lengths and with a constant distance apart. However, receiver 10 of the present invention is also operable for other source/receiver configurations.

For the case that occurs when the total water depth is substantially greater than the water depth of the source/receiver, and assuming the directivity characteristic of receiver 10 attenuates surface and bottom reflections, there will be two dominant propagation paths. The first path will be from the source/receiver to the object and back to the source/receiver. The second path will be from the source/receiver to the object to the ocean surface and back to the source/receiver. For the present analysis, it is assumed that the underwater object to be detected is physically structured such that it produces only one or substantially only one reflection. The two signals propagated along these two paths produce a combined signal 12 at receiver 10 having substantially two parts, each having different amplitude and phase characteristics. The resultant signal 12 is therefore embedded in noise from the surrounding environment. To improve detection performance with conventional processors, it is beneficial to be able to process each part of the composite signal (and noise) independently. However, because the signal time delays due to the different propagation path lengths are unknown, the separation time between the two signals is unknown.

In the present invention, received signal 12 is preferably stored in register or memory 14 so that signal 12 can be repeatedly processed in accord with the present invention. From memory 14, signal 12 is applied to each of the two parallel configured receivers 16 and 18, which in the presently preferred embodiment are quadrature receivers. As discussed above, the receivers could be of other types but quadrature receivers are often used for processing this type of signal. Integration control 20, which may be programed and/or include one or more control components, is used for controlling the integration interval of each of parallel configured receivers 16 and 18. Integration control 20 or another control is used to repetitively transfer signal 12 to receivers 16 and 18 from memory 14.

In accord with the present invention, received signal 12 is divided into two separate intervals, 12a and 12b, each signal interval is processed independently and the outputs from 16 and 18 that may typically include in-phase and quadrature signal components are combined, such as by summing component 22. Combining or summing component 22 may be hardware or software implemented or may be a combination of both. Integration control 20 provides that received signal 12 is made available to each receiver 16 and 18. Integration control 20 also provides that received signal 12 is divided into two separate intervals, 12a and 12b, and controls receivers 16 and 18 such that each receiver processes the received signal over one of the two separate intervals, e.g., receiver 16 processes the received signal 12 over interval 12a and receiver 18 processes received signal 12 over interval 12b.

For instance as indicated in FIG. 2, receiver 16 will process received signal 12 over an interval from time zero to time T1. Receiver 18 would then process signal 12 over an interval from time T1 to time T. Thus, the two intervals from time zero to time T1 and from time T1 to time T are contiguous but separate. Time T1, the separation time, is varied with each repetition of the process until threshold detector 24 produces an output 26 that indicates detection of an underwater object or until time T1 extends to time T. Thus, T1 begins at a selected time from time zero for the first processing repetition. Time or separation interval T1 is then increased by a selected amount to a second position for the second processing repetition. This process continues for a full processing cycle that ends as described above. Preferably, processing occurs in real time so that the processing is completed before a subsequent pulse is received. However, particularly in other applications such as medical applications it would not always be necessary for all processing to occur in real time, i.e., prior to the receipt of the next pulse. The amount by which T1 increases each time may be a fixed amount or may be variable, as desired. Likewise, the beginning time T1 may be selected, as desired.

FIG. 2 also illustrates operation of threshold detector 24. Summer output 26 is applied to threshold detector 24. Threshold detector 24 indicates an underwater object is detected when a pulse is received and processed for which summer output 26 exceeds threshold level 28 as indicated on axis 30 which may be an amplitude expressed as a voltage, current, or other signal level depending on the type of circuitry/hardware/software used. In the present example, the signal level 32 exceeds the threshold 28 when the separation time is T1 DET as shown in FIG. 2 along time axis 34 for one of the processing repetitions. Output 36 of threshold detector 24 may be a high output voltage or other signal to thereby indicate an underwater object.

While the present invention will be described in connection with presently preferred embodiments, it will be understood that it is not intended to limit the invention to those embodiments. Various other embodiments of the invention may also be implemented. For instance, instead of an automatic variation of T1, a manual control may also be implemented. For instance, the operator may use an interactive technique of adjusting T1 manually using computer controls. The adjustment could also be used along with the automatic control described above. The adjustment may also include a locking mechanism whereby T1 is used as a starting point for processing subsequent pulses. Known information such as water depth may also be used to pick a starting T1. As well, if an approximate distance to the object is estimated then the approximate angles and lengths of propagation paths can be used to determine a starting T1. Alternatively, T1 could be varied from time T to time zero instead of from time zero to time T as discussed above. Time T1 could also be varied in alternating directions around an initial starting point. Other methods of varying time T1 could also be programmed as desired.

In yet another embodiment, additional parallel processors may be used for processing of additional intervals, e.g., three quadrature receivers may be used for processing over three time intervals of the received signal to reduce noise from three propagated signals, and so forth. The addition of a third or fourth signal increases the amount of necessary processing. In some cases, assumptions may be made about the intervals and relative lengths thereof based on known water depths or other known factors to decrease the amount of processing required. More processing time could be allocated if additional sets of receivers were to process pulses received, e.g., two sets of receivers so that each receiver would process every other pulse. In yet other embodiments, the present invention may be used with acoustic medical devices for improved reception, as discussed hereinbefore, wherein real time processing is not at all necessary.

In summary of operation, a return pulse is received and stored in memory 14. Parallel quadrature receivers 16 and 18 are used to integrate repetitively and automatically of continually varying but contiguous intervals. When output 26 of summer 22 exceeds detection threshold 28 of threshold detector 24, output 36 from threshold detector 24 indicates the presence of an underwater object. Parallel configured receivers 16 and 18 are controlled by integration controller 20 to integrate over different but contiguous signal intervals with a first receiver integrating from time zero to variable time T1 and a second receiver integrating from time T1 to time T. Separation time T1 is varied for each processing repetition. A typical sequence may vary separation time T1 from near time zero with subsequent repetitions approaching or reaching time T or until a detection occurs. If threshold 28 is exceeded for any value of T1, a detection signal 36 is produced and processing is terminated for that pulse. FIG. 2 shows a typical result showing the threshold exceeded at a value of T1 DET.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for detecting a reflected acoustic signal within a received signal that comprises noise due to a multipath environment, said system comprising:
   at least two receivers for processing said received signal;
   a connection configuration for said at least two receivers such that each of said at least two receivers are in communication with said received signal;
   a combining component for combining respective outputs of each of said at least two receivers to produce a combined output;
   a detector component for producing a signal when said combined output indicates said reflected acoustic signal is detected; and
   at least one control for controlling said at least two receivers such that said at least two receivers operate on said received signal over different time intervals.

2. The system of claim 1, further comprising a memory for storing said received signal, said stored signal being available for repetitive processing by said at least two receivers through said connection configuration.

3. The system of claim 2 wherein said at least one control is operable for varying respective time lengths for said different respective time intervals.

4. The system of claim 2 wherein said receivers are quadratrure receivers.

5. A system for detecting a reflected acoustic signal within a received signal that comprises noise due to a multipath environment, said system comprising:
   at least two receivers;
   at least one control for controlling said at least two receivers for processing said received signal over at least two different time intervals;
   a memory for storing said received signal; and
   a connection between said memory and said at least two receivers.

6. The system of claim 5 wherein said at least one control is operable for varying respective time lengths of said at least two different time intervals.

7. The system of claim 6 wherein said at least one control is operable for providing that said at least two different time intervals are contiguous.

8. The system of claim 5 further comprising a combining component for combining respective outputs of said at least two receivers to provide a combined output.

9. The system of claim 8 further comprising a detector for detecting a variation in a characteristic of said combined output.

10. A method for detecting a reflected acoustic signal within a received signal that comprises noise due to a multipath environment, said method comprising the steps of:

dividing said received signal into at least two intervals, each of said at least two intervals having respective time spans;

independently processing said received signal over each of said at least two intervals to provide at least two outputs;

repetitively processing said received signal; and changing said respective time spans of said at least two intervals during said repetitive processing.

11. The method of claim 10 further comprising the steps of:

monitoring said at least two outputs for a characteristic signal; and stopping said repetitive processing upon production of said characteristic signal.

12. The method of claim 10 further comprising the step of stopping said repetitive processing after a preselected number of repetitions.

13. The method of claim 10 further comprising the steps of:

saving said received signal; and repetitively communicating said received signal for processing.

14. The method of claim 10 further comprising the steps of:

combining said at least two outputs to provide a combined output; and comparing said combined output to a selected threshold level to indicate an underwater object.

15. A method for detecting an acoustic signal transmitted in a multipath environment such that a received signal includes a reflected acoustic signal embedded in noise due to said multipath environment, comprising the steps of:

applying said received signal to at least two different receivers;

processing said received signal over at least two different time intervals with said at least two different receivers to produce at least two processed outputs, respectively;

selectively repeating said steps of applying and processing for up to a predetermined number of repetitions; and varying a length of each of said two different intervals for each of said repetitions.

16. The method of claim 15 further comprising the steps of:

combining said at least two processed outputs to provide a combined output;

determining if a characteristic of said combined output is present; and stopping said step of applying and processing prior to reaching said predetermined number of repetitions if said characteristic of said combined output is present.

17. The method of claim 15 wherein said processing step further comprises choosing said at least two different time intervals to be contiguous, non-overlapping time intervals.

18. The method of claim 17 wherein said at least two different time intervals have a total duration equal to a duration of said acoustic signal.

19. The method of claim 15 further comprising the step of storing said received signal.

\* \* \* \* \*